United States Patent [19]

Wu et al.

[11] Patent Number: 5,761,727
[45] Date of Patent: Jun. 2, 1998

[54] CONTROL APPARATUS FOR A MEMORY ARCHITECTURE USING DEDICATED AND SHARED MEMORY SEGMENTS

[75] Inventors: Wen-Yi Wu, Chupei; Gene Yang, Tao Yuan, both of Taiwan

[73] Assignee: United Microelectronics Corporation, Hsinchu, Taiwan

[21] Appl. No.: 626,363

[22] Filed: Apr. 2, 1996

[51] Int. Cl.$^6$ .................................................. G06F 12/00
[52] U.S. Cl. .................................... 711/147; 364/DIG. 1
[58] Field of Search ................................ 395/478, 516, 395/800, 474, 147; 382/307

[56] References Cited

U.S. PATENT DOCUMENTS

| | | | |
|---|---|---|---|
| 4,545,068 | 10/1985 | Tabata et al. | 382/307 |
| 4,831,523 | 5/1989 | Lewis et al. | 395/848 |
| 4,882,683 | 11/1989 | Rupp et al. | 395/516 |
| 5,043,874 | 8/1991 | Gagliardo et al. | 395/478 |
| 5,107,416 | 4/1992 | Jippo et al. | 395/800 |
| 5,524,265 | 6/1996 | Balmer et al. | 395/800 |

*Primary Examiner*—Tod R. Swann
*Assistant Examiner*—David Langjahr
*Attorney, Agent, or Firm*—Cushman Darby & Cushman IP Group of Pillsbury Madison & Sutro LLP

[57] ABSTRACT

Disclosed is a memory control device with partitioned memory control for use on a computer system configured based on a shared main memory architecture. The memory control device comprises a main memory controller connected with two sets of access control buses used respectively for partitioned control of the main memory. The main memory is partitioned into a main system dedicated memory segment and a shared resource memory segment respectively for use by the CPU and the peripheral system. A shared data path circuit is used to control data flow on the buses. When the CPU and the peripheral system both want to gain access to the main memory at the same time, the two sets of buses work independently to respectively connect the CPU to the main system dedicated memory segment and the peripheral system to the shared resource memory segment in the main memory for simultaneous, partitioned access to the main memory.

3 Claims, 2 Drawing Sheets

CONTROL APPARATUS FOR A MEMORY ARCHITECTURE USING DEDICATED AND SHARED MEMORY SEGMENTS

BACKGROUND OF THE INVENTION

1. Field of the Invention

The present invention relates to computer system main memory control arrangements, and more particularly, to a memory control arrangement allowing a central processing unit (CPU) and peripheral devices to gain access to the main memory in a shared main memory architecture.

2. Description of Prior Art

In computer systems configured based on a shared main memory architecture, the peripheral system and the CPU time share the main memory and the access bus to the main memory. Thus, at any given time, one of the CPU and the peripheral system can gain access to the main memory. A drawback to such a system configuration is that when the peripheral system is too heavily loaded with tasks that need frequent access to the main memory, the CPU could be kept in a waiting state for quite a long time such that the throughput and efficiency of the CPU could be adversely affected.

This drawback is illustrated by a practical example shown in FIG. 1 (Prior Art), which shows a computer system configuration based on a shared main memory architecture that allows the CPU 110 and a peripheral system such as a video graphic accelerator 150 to time share the main memory, here constituted by a DRAM 140. The CPU 110 is the heart of the computer system, whose processing efficiency represents that of the overall system. The CPU 110 gains access to the DRAM 140 (the main memory) via a main memory controller 120 and a data buffer controller 130. In order to enhance system efficiency, the main memory controller 120 has the control of DRAM 140 during normal operating conditions. To gain access to the DRAM 140, the CPU 110 issues an address signal via the address bus 115 to the main memory controller 120 for the main memory controller 120 to decode the address signal. The decoded address is then sent via the access control bus 125 to the DRAM 140. Access control buses include row address control bus 121, column address control bus 122, and memory address bus 123. When the CPU 110 wants to gain access to the DRAM 140, the main memory controller 120 issues a control signal to the data buffer controller 130. If the CPU 110 wants to read data out of the DRAM 140, the DRAM 140 will put the required data on the memory data bus 145 and then the data buffer controller 130 will transfer the data on the memory data bus 145 to the data bus 113 for the CPU 110 to fetch the data. When the CPU 110 wants to write data into the DRAM 140, it puts the data on the data bus 113, allowing the data buffer controller 130 to fetch the data thereon and then transfer the data to the memory data bus 145 connected to the DRAM 140.

Since the computer system is configured based on a shared main memory architecture, data of the video peripheral system is also stored in the DRAM 140. Therefore, if the video graphic accelerator 150 wants to gain access to the DRAM 140, it first issues a memory request signal MREG# to the main memory controller 120, and then waits until the CPU 110 completes its current read/write operation. After that, the main memory controller 120 returns the memory grant signal MGNT#. Concurrently, the main memory controller 120 puts its I/O ports that are connected to the access control bus 125 at high impedance so as to yield the control of the access control bus 125. The video graphic accelerator 150 then issues a succession of access control bus signals via the access control bus 125 to the DRAM 140 so as to gain access to the DRAM 140. After the read/write operation is completed, the video graphic accelerator 150 will put its I/O ports that are connected to the access control bus 125 at high impedance so as to yield the control of the access control bus 125, and also clear the memory request signal MREG#. This allows the main memory controller 120 to regain control of the main memory and the system returns to normal operating conditions.

Whenever the video peripheral system wants to gain access to the main memory, the foregoing procedure is repeated. When the video peripheral system is in control of the main memory, the CPU is not able to perform read/write operation on the main memory, and vice versa. The conventional memory control scheme for the CPU and the peripheral system to share the main memory is therefore disadvantageous in terms of overall efficiency. When the peripheral system is heavily loaded with tasks that require frequent access to the main memory, the CPU will be virtually disabled in performing its own tasks. With the capacity of a single memory chip getting higher and higher, the shared main memory architecture is becoming a mainstream architecture for a computer system. The aforementioned problem would therefore prevail in computer systems using the shared main memory architecture.

SUMMARY OF THE INVENTION

It is therefore a primary objective of the present invention to provide a memory control device with partitioned control of the main memory to control the sharing of the main memory by the CPU and the peripheral system by the use of two sets of access control bus signals so as to avoid the waiting state and enhance system efficiency and throughput.

In accordance with the foregoing and other objectives of the present invention, there is provided a novel memory control device with partitioned control of the main memory based on a shared main memory architecture. The memory control device comprises a main memory unit partitioned into a main system dedicated memory segment and a shared resource memory segment coupled respectively to the data buffer controller and the peripheral system. The main system dedicated memory segment is used for data storage by the CPU and the shared resource memory segment is used for shared data storage by the CPU and the peripheral system. A shared data path circuit coupled to the data buffer controller, the peripheral system, and the main memory unit is used to control data flow between the coupled units. The shared data path circuit allows two independent data paths to be formed, respectively connecting the CPU to the main system dedicated memory segment and the peripheral system to the shared resource memory segment when the CPU and the peripheral system both want to gain access to the main memory unit. A multiplexer coupled to the peripheral system and the main memory unit is used to selectively connect either the main memory controller or the peripheral system to the shared resource memory segment. Also the multiplexer works in cooperation with the shared data path circuit to allow the two independent data paths to be formed when the CPU and the peripheral system both want to gain access to the main memory unit. A main memory controller coupled to the CPU, the data buffer controller, the peripheral system, the main memory unit, the shared data path circuit, and the multiplexer are used to control the operation and scheduling of the main memory unit.

The main memory controller is connected with two sets of access control buses used respectively for partitioned control of the main memory unit. When the CPU and the peripheral system both want to gain access to the main memory unit at the same time, the main memory controller controls the multiplexer in such a way as to allow the two sets of buses to work independently to respectively connect the CPU and the peripheral system to the main memory unit.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
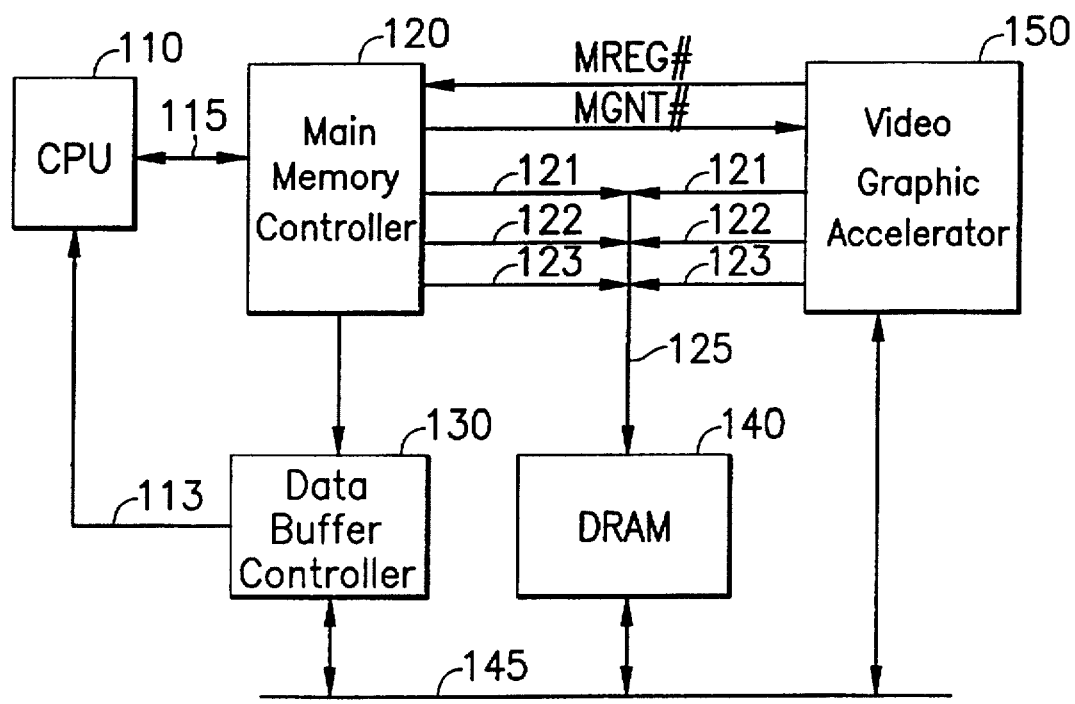
FIG. 1 (Prior Art) is a block diagram showing a conventional system configuration for a video graphic accelerator to share the main memory with the CPU.
Figure 2:
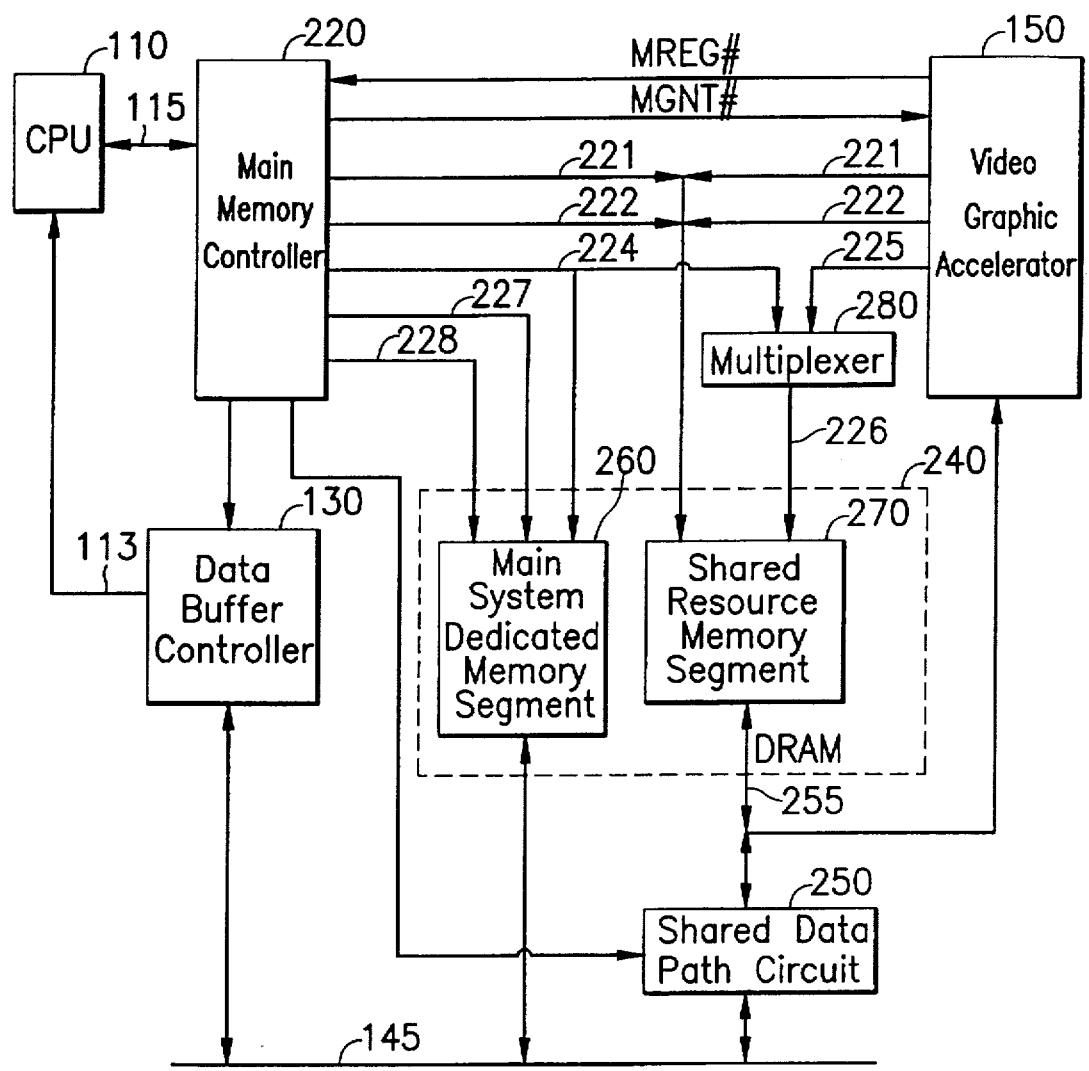
FIG. 2 is a block diagram showing a preferred embodiment of the memory control device in accordance with the present invention for controlling the access to the main memory by a video graphic accelerator and the CPU based on shared main memory architecture.

FIG. 2 is a block diagram of a preferred embodiment of the memory control arrangement in accordance with the present invention for controlling the access to the main memory, constituted by DRAM 240, by a video graphic accelerator 150 and the CPU 110 based on a shared main memory architecture. The arrangement according to the invention features partitioned control of the main memory for controlling the sharing of the main memory by the CPU 110 and a peripheral system, such as a video graphic accelerator 150; and based on the shared main memory architecture. The memory control device includes a main memory controller 220, a DRAM 240, a multiplexer 280, and a shared data path circuit 250. In accordance with the present invention, the DRAM 240 is partitioned based on its available size into a main system dedicated memory segment 260 and a shared resource memory segment 270. The main system dedicated memory segment 260 is dedicated for use by the main system and has its own access control bus and data bus. The main system can always gain access to the main system dedicated memory segment 260 even if the peripheral system is in control of the main memory, allowing the main system to not be kept in a waiting state for access to the main memory. System efficiency and throughput are therefore not degraded.

When the CPU 110 needs to gain access to the main system dedicated memory segment 260 in the DRAM 240, it issues an address signal via the address bus 115 to the main memory controller 220 which decodes the address signal to determine where in the DRAM 240 the CPU 110 intends to gain access. The main memory controller 220 then issues a succession of access control signals respectively via the row address control bus 227, the column address control bus 228, and the main system memory address bus 224 so as to gain access to the main system dedicated memory segment 260 of DRAM 240. The main memory controller 220 commands the shared data path circuit 250 to disable the shared data bus 255 and the memory data bus 145, and also issues a control signal to the data buffer controller 130. If the CPU 110 wants to read data, the main system dedicated memory segment 260 in the DRAM 140 will put the data on the memory data bus 145, allowing the data buffer controller 130 to transfer the data thereon via the data bus 113 to the CPU 110.

If the CPU 110 wants to write data into the main memory, the CPU 110 will put the data on the data bus 113 and then the data buffer controller 130 will transfer the data thereon via the memory data bus 145 to the main system dedicated memory segment 260 in the DRAM 140.

If the video graphic accelerator 150 wants to gain access to the shared resource memory segment 270 in the DRAM 240 while the CPU 110 gains access to the main system dedicated memory segment 260, the video graphic accelerator 150 issues memory request signal MREG# to the main memory controller 220. Since at this time the CPU 110 is in read/write operation on the main system dedicated memory segment 260, the shared access control bus is idle. This causes the main memory controller 220 to return immediately the memory grant signal MGNT# and also put its I/O ports that are connected to the shared row address control bus 221 and the shared column address control bus 222 at high impedance so as to yield the control of the two buses 221 and 222. Meanwhile, the main memory controller 220 controls the multiplexer 280 to connect the shared memory address bus 226 to the peripheral memory address bus 225. The video graphic accelerator 150 then issues a succession of access control signals respectively via the shared row address control bus 221, the shared column address control bus 222, and the peripheral memory address bus 225 so as to gain access to the shared resource memory segment 270 in the DRAM 240. After the read/write operation is completed, the video graphic accelerator 150 puts its I/O ports that are connected to the shared row address control bus 221 and shared column address control bus 222 at high impedance so as to yield the control of the two buses 221 and 222, and also clears the memory request signal MREG# to inform the main memory controller 220 that the read/write operation is completed.

Likewise, while the video graphic accelerator 150 gains access to the shared resource memory segment 270 in the DRAM 240, the CPU 110 can concurrently gain access to the main system dedicated memory segment 260 in the DRAM 240.

When the CPU 110 wants to gain access to the shared resource memory segment 270 in the DRAM 240, the CPU 110 issues a corresponding address signal via the address bus 115 to the main memory controller 220 which decodes the address signal to determine where in the DRAM 240 the CPU 110 intends to gain access. At first, the main memory controller 220 controls the multiplexer 280 to connect the shared memory address bus 226 to the main system memory address bus 224, and then issues a succession of access control signals via the shared row address control bus 221, the shared column address control bus 222, and the main system memory address bus 224 so as to gain access to the shared resource memory segment 270 in the DRAM 240. Meanwhile, the main memory controller 220 issues a control signal to the shared data path circuit 250 and the data buffer controller 130. If at this time the CPU 110 wants to read data, the shared resource memory segment 270 in the DRAM 140 will put the data on the shared data bus 255, allowing the shared data path circuit 250 to transfer the data thereon to the memory data bus 145 and subsequently via the data buffer controller 130 to the data bus 113 connected to the CPU 110.

If the CPU 110 wants to write data into the main memory, the CPU 110 will put the data on the data bus 113 and then the data buffer controller 130 will transfer the data via the memory data bus 145 and the shared data path circuit 250 to the shared data bus 255 connected to the shared resource memory segment 270 in the DRAM 240.

If the video graphic accelerator 150 wants to gain access to the shared resource memory segment 270 in the DRAM 240 while the CPU 110 is accessing the main system dedicated memory segment 260, the video graphic accelerator 150 issues memory request signal MREG# to the main memory controller 220. Then the video graphic accelerator 150 has to wait until the CPU 110 completes its current read/write operation on the main memory. After that, the main memory controller 220 returns the memory grant signal MGNT# and also puts its I/O ports that are connected to the shared row address control bus 221 and shared column address control bus 222 at high impedance so as to yield the control of the two buses 221 and 222. Concurrently, the main memory controller 220 controls the multiplexer 280 to connect the shared memory address bus 226 to the peripheral memory address bus 225. The video graphic accelerator 150 then issues a succession of access control signals via the shared row address control bus 221, the shared column address control bus 222, and the peripheral memory address bus 225 to gain access to the shared resource memory segment 270 in the DRAM 240. The main memory controller 220 concurrently commands the shared data path circuit 250 to disable the shared data bus 255 and the memory data bus 145. After the read/write operation is completed, the video graphic accelerator 150 puts its I/O ports that are connected to the shared row address control bus 221 and shared column address control bus 222 at high impedance so as to yield the control of the two buses 221 and 222, and also clears the memory request signal MREG# to inform the main memory controller 220 that the read/write operation is completed.

Likewise, if the CPU 110 wants to gain access to the main system dedicated memory segment 260 in the DRAM 240 while the video graphic accelerator 150 is in a read/write operation on the shared resource memory segment 270 in the DRAM 240, the CPU 110 has to wait until the video graphic accelerator 150 completes its current read/write operation and yields the control of the buses.

Since the system is provided with two sets of access control buses for partitioned control of the main memory, the CPU 110 is able to gain access to the main system dedicated memory segment 260 in the DRAM 240 while the video graphic accelerator 150 gains access to the shared resource memory segment 270 in the DRAM 240. This provision allows the main system and the peripheral system not to be kept in waiting state when they need to use the main memory. The overall system efficiency is thus improved. If the main system dedicated memory segment 260 is increased in size, the shared resource memory segment 270 is decreased in size, which could allow the main system to be further improved in its operating efficiency.

In various modifications, the DRAM 240 can be fully assigned for dedicated use by the video graphic accelerator 150. The CPU 110 and the video graphic accelerator 150 will be free from the waiting state whenever they need to use the main memory. This modification would allow the operating efficiency of each of the two units 110, 150 to achieve the optimum.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A memory control arrangement for a computer system having a shared main memory architecture, the computer system having at least a CPU, and a peripheral system, the memory control arrangement comprising:

a main memory unit partitioned into a main system dedicated memory segment and a shared resource memory segment for coupling respectively to the CPU and the peripheral system, the main system dedicated memory segment being used for data storage by the CPU and the shared resource memory segment being used for shared data storage by the CPU and the peripheral system;

a shared data path circuit, coupled to the CPU, the peripheral system, and the main memory unit, for allowing data flow therebetween, the shared data path circuit allowing two independent data paths to be formed, respectively connecting the CPU to the main system dedicated memory segment and connecting the peripheral system to the shared resource memory segment when the CPU and the peripheral system simultaneously want to gain access to the main memory unit;

a main memory controller; and a multiplexer, coupled to the peripheral system, the main memory unit, and the main memory controller for selectively connecting one of the main memory controller and the peripheral system to the shared resource memory segment, the multiplexer working in cooperation with the shared data path circuit to allow the two independent data paths to be formed when the CPU and the peripheral system simultaneously want to gain access to the main memory unit, wherein the main memory controller, is coupled to the CPU, the peripheral system, the main memory unit, the shared data path circuit, and the multiplexer, for controlling operation and scheduling of the main memory unit, the main memory controller being connected with two sets of access control buses used respectively for partitioned control of the main memory unit, whereby when the CPU wants to gain access to the main system dedicated memory segment in the main memory unit and simultaneously the peripheral system wants to gain access to the shared resource memory segment, the main memory controller controls the multiplexer so as to allow the two sets of buses to work independently to respectively connect the CPU and the peripheral system to the main memory unit.

2. A memory control arrangement as claimed in claim 1, wherein the main memory unit comprises DRAM.

3. A memory control arrangement as claimed in claim 1, wherein the main memory unit comprises DRAM and the shared resource memory segment comprises a portion of the DRAM dedicated for use by the peripheral system, allowing the CPU and the peripheral system to have respective dedicated memory segments in the main memory unit.

* * * * *